Nov. 13, 1928.
D. M. PALMER
1,691,249
DIESEL ELECTRIC LOCOMOTIVE
Filed April 30, 1926   2 Sheets-Sheet 2
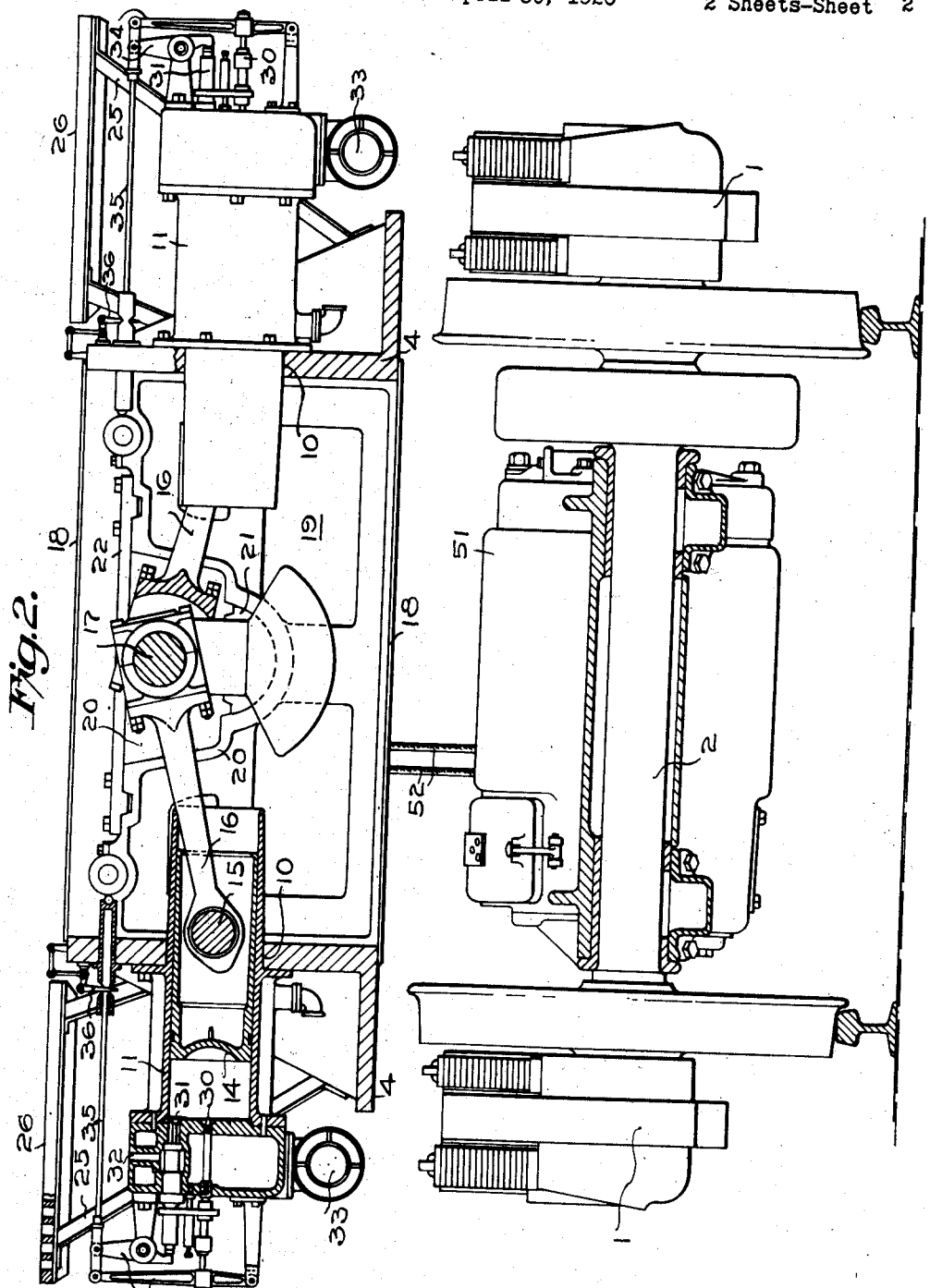
WITNESSES:
R. S. Harrison
W. D. O'Connor
INVENTOR
Delos M. Palmer
BY
ATTORNEY Patented Nov. 13, 1928.

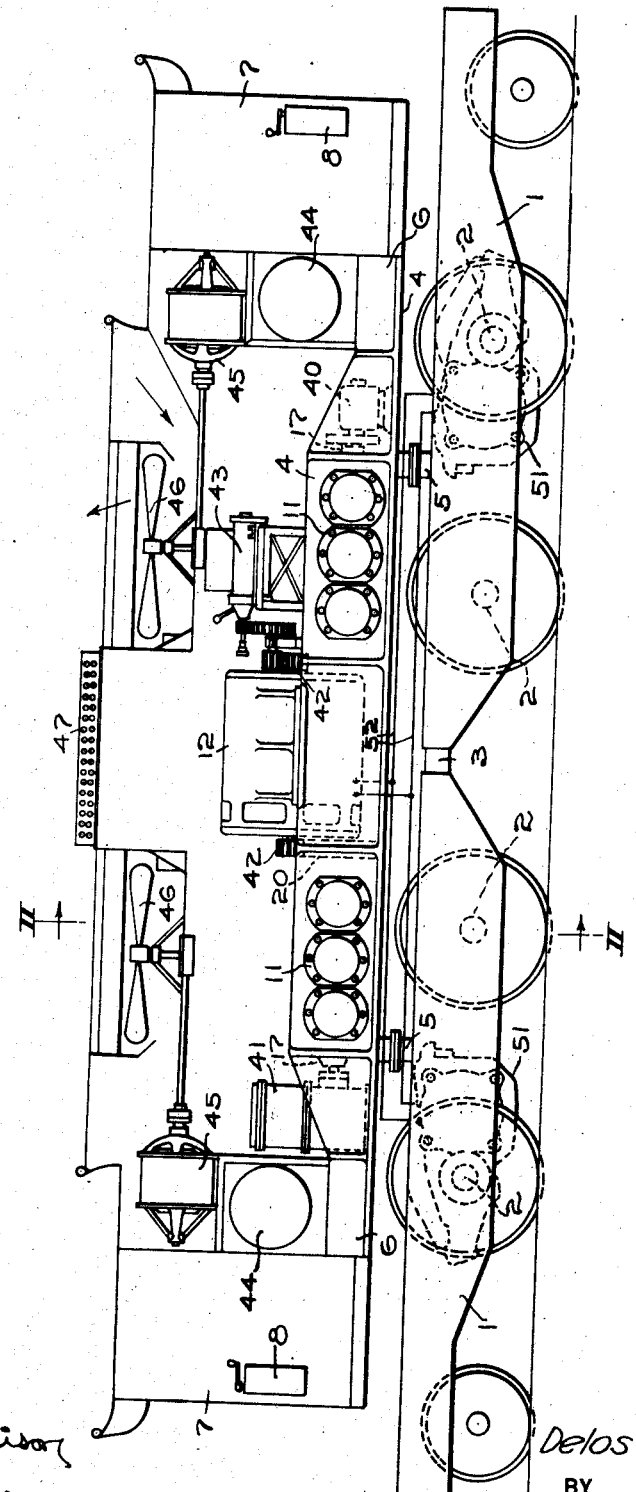

1,691,249

UNITED STATES PATENT OFFICE.

DELOS M. PALMER, OF SWISSVALE, PENNSYLVANIA, ASSIGNOR TO WESTINGHOUSE ELECTRIC & MANUFACTURING COMPANY, A CORPORATION OF PENNSYLVANIA.

DIESEL-ELECTRIC LOCOMOTIVE.

Application filed April 30, 1926. Serial No. 105,750.

My invention relates to self-propelled railway vehicles and particularly to electrically-driven vehicles embodying internal-combustion prime movers of the Diesel type.

It is among the objects of my invention to provide a Diesel-electric locomotive embodying an engine of novel construction which shall comprise a minimum number of parts of simple, durable and rugged mechanical construction, which shall be readily accessible for inspection and renewal of the several parts constituting the engine members, and which shall be so constructed and contained in the supporting frame structure of the locomotive as to effect a considerable reduction in the total weight of the vehicle.

Another object of my invention is to provide a Diesel-electric locomotive so constructed that the engine members and the electrical generator will require minimum space, thereby providing additional space for other equipment and greatly facilitating the operation of the locomotive unit.

Various types of Diesel-electric drives have been proposed heretofore embodying different operating mechanisms, that is, the relation of the reciprocating engine member relative to the supporting frame structure and the manner of operatively connecting the engines to the generator and the supplemental arrangement of the accessories, such as exciters and air compressor members.

My invention embodies a novel design of Diesel-electric drive construction, which is distinguished from all known prior types in that the reciprocating engine members are embodied in the main frame of the locomotive, which facilitates its assembly and simplifies the connection of the engine with the electrical generator. The individual cylinder blocks of the engines are detachably mounted on the locomotive side frames to constitute the engines proper. The manner of mounting which I employ, renders every part of the operating mechanism readily available for inspection and locates the same entirely outside of the locomotive cab proper.

In the accompanying drawings constituting a part thereof,

Fig. 1 is a side elevational view of a Diesel-electric locomotive embodying the principles of my invention, and Fig. 2 is a view, partially in section and partially in elevation, taken along the lines II—II of Fig. 1.

Referring to the drawings, the structure therein illustrated comprises a plurality of truck members 1, which are journaled on wheel axles 2, in the usual manner, and may be coupled by a pivotal connection 3, for articulation. A locomotive cab embodying the usual sub-frame construction 4 is mounted on the trucks 1 by center pin connections 5, to permit chording of the cab member when the supporting trucks are rounding a curved portion of the railway tracks. The frame structure 4 is provided with longitudinally extending portions 6, which constitute a part of the equipment deck and provide the floors for end compartments 7, in each of which control equipment 8 is mounted for use by the operator.

The frame portion 4 may be an integral casting or individual side frames properly joined and reenforced to constitute a rigid frame or bed for supporting the operating mechanism and the locomotive cab.

In accordance with my invention, the side frame portions 4 are provided with two sets of openings 10 adapted to receive cylinder blocks 11 which are disposed in side-by-side relation on each side of the cab, with their axes in the same horizontal plane. The cylinders 11 may be grouped in any number to provide horizontal-opposed engines having the desired capacity for one or more generators 12, which are supported by the frame 4 between the two engines or sets of cylinders to develop electric power for operating the vehicle.

The engine cylinders are provided with piston members 14 (Fig. 2) having the usual wrist pins 15 for supporting connecting rods 16, which are connected to common crank shafts 17; that is, the connecting rods 16 of the engine members disposed on both sides of the frame portions 4 are joined to the crank-shafts 17, which are centrally disposed therebetween. Top and bottom closures or covers 18 are secured to the side frames 4, thus providing a dust-and-oil-proof chamber or crankcase 19 in which the crank-shafts 17 operate. The lower portions of transversely mounted saddles or supporting members 20 are provided with main bearings 21, which are properly reenforced by cross-ties 22 between the side frames 4. Mounted on the side frames 4 and properly supported thereon by angle irons 25 are platforms 26 which constitute floor space for passages for the operator.

The operating mechanism of the engines comprises fuel valves 30 and the usual alined intake and exhaust valves 31 opening to intake chambers 32 and exhaust manifolds 33, respectively, as is customary. The valves are operated through an overhead mechanism comprising rocker arms 34 that are actuated by push rods 35, the ends of which contact with regulators 36 that regulate the length of the stroke, thereby controlling the fuel supply that is admitted to the combustion chamber by the fuel valves 30.

Referring to Fig. 1 of the drawing, the end of one crank-shaft 17 is connected to an exciter 40 for the generator 12 and the crankshaft of the other engine member is connected to an air compressor 41 for the air brake system. The proximate ends of the crank shafts 17 are geared by gear-wheels and pinions 42 to the generator 12, and the latter is operatively connected to an auxiliary internal combustion engine 43 of sufficient capacity to crank the main engines.

Mounted on the extending portions 6 of the frames 4 are compressed air chambers or tanks 44 over which are mounted electric motors 45 for ventilating fans 46, and on the roof of the cab is mounted a condenser 47 which is properly connected with the cooling system of the engines.

The truck members 1 are equipped with driving motors 51 that are of standard construction for railway service. Cables 52 are provided for electrically connecting the generator 12 to the motors 51 and control is provided by means of the control equipment 8 that operates according to the standard Ward-Leonard system.

The operation of my device is briefly as follows:

The respective crank shafts 17 of the oil engines being connected through the generator 12, are jointly rotated when the cranking engine 43 is operated. In this manner, the starting of the oil engines is greatly facilitated and accomplished in a very short length of time. The main oil engines may then be operated at a suitable rate of speed through their control by the governor mechanism 36 to generate the power required for propelling the locomotive and its load.

I do not claim as novel any of the detailed arrangements of the engine members or the arrangement of the cooling system, driving motors and the accessory apparatus, as my invention resides in the novel mounting of the oil engines in the main sub-frame structure of the locomotive frame, as herein described.

It is evident from the foregoing description of my invention that a Diesel-electric locomotive constructed in accordance therewith will be much lighter in weight than Diesel-electric locomotives of like power built heretofore. As the greatest limitation of such locomotives has been their large ratio of weight to delivered power, it is obvious that my invention provides means for adapting Diesel-electric locomotives to fields of operation from which they have been heretofore excluded. My design provides for easy access to the operating parts of the internal combustion engine for the repair or replacement of worn parts. The novel location of the engine cylinders makes them accessible from the outside of the cab and also provides a large amount of space for other equipment in the central portion of the cab.

Although I have described a specific embodiment of my invention, it will be obvious to those skilled in the art that various modifications may be made in the details of construction and in the arrangement of the several co-operating parts without departing from the spirit thereof.

I claim as my invention:

1. In an oil-electric locomotive, the combination with a truck and cab structure, of two multicylinder horizontal-opposed oil engines having their crankshafts disposed longitudinally of the cab, and an electric generator mounted between said engines and operatively connected thereto.

2. In a Diesel-electric locomotive, the combination with a truck and cab structure, of two multicylinder horizontal-opposed Diesel engines having their crankshafts disposed longitudinally of the cab, and an electric generator mounted between said engines and operatively connected thereto and having its shaft parallel to and above the line of the engine crankshafts and operatively connected to both crankshafts.

3. A locomotive comprising truck members, a frame supported on the truck members, a crankshaft mounted longitudinally of the frame, engine cylinders removably mounted in the frame on either side of said crankshaft, pistons in said cylinders and connecting rods for transmitting energy from the pistons to the crankshaft.

4. In a Diesel-electric locomotive, the combination with a truck and cab structure, of an assembled unit comprising a frame mounted on the truck structure and supporting the cab, engine cylinders mounted on either side of the frame with their axes in transverse relation thereto, crankshafts mounted longitudinally of the frame, a generator supported by the frame and operatively connected to the crankshafts, and a small internal combustion engine operatively connected to the generator for starting the main engine comprising said cylinders.

5. A locomotive comprising truck members, a pair of side frame members supported on the truck members, internal-combustion engine cylinders removably mounted in each of the side frame members in horizontal opposed relation, crankshafts disposed between the cylinders and operatively connected thereto, said shafts extending longitudinally of the side frames, and means for transmitting power from the crankshafts to the truck members for driving the locomotive.

6. In a locomotive, the combination with truck members and a frame supported on the truck members, of two horizontal-opposed internal combustion engines comprising crankshafts, said engines being mounted in the frame with their crankshafts disposed longitudinally thereof, an electric generator mounted between the engines and operatively connected to the crankshafts, electric motors mounted on the truck members for driving the locomotive, and means for transmitting electric energy from the generator to the motors.

In testimony whereof, I have hereunto subscribed my name this 26th day of April, 1926.

DELOS M. PALMER.